(12) United States Patent
Petrucci et al.

(10) Patent No.: US 9,263,091 B2
(45) Date of Patent: Feb. 16, 2016

(54) SYSTEMS AND METHODS FOR VIDEO PLAYBACK CONTROL

(71) Applicant: GM Global Technology Operations LLC, Detroit, MI (US)

(72) Inventors: David R. Petrucci, Warren, MI (US); Douglas C. Martin, Warren, MI (US); Charles A. Massoll, Warren, MI (US); Mark P. Friedrich, Warren, MI (US); Charlene A. Goike, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 175 days.

(21) Appl. No.: 13/896,227

(22) Filed: May 16, 2013

(65) Prior Publication Data

US 2014/0341535 A1  Nov. 20, 2014

(51) Int. Cl.
| | |
|---|---|
| *H04N 5/217* | (2011.01) |
| *G11B 27/30* | (2006.01) |
| *H04N 9/87* | (2006.01) |
| *G11B 27/10* | (2006.01) |

(52) U.S. Cl.
CPC .......... *G11B 27/3081* (2013.01); *G11B 27/105* (2013.01); *H04N 9/87* (2013.01)

(58) Field of Classification Search
CPC ........ H04W 4/02; G11B 27/36; G11B 7/3081
See application file for complete search history.

(56) References Cited

U.S. PATENT DOCUMENTS

| | | | |
|---|---|---|---|
| 2005/0023899 A1* | 2/2005 | Kitazawa | 307/10.1 |
| 2007/0067415 A1 | 3/2007 | Kawaguchi | |
| 2007/0124041 A1* | 5/2007 | Kwon et al. | 701/35 |
| 2008/0111886 A1* | 5/2008 | Bai | 348/173 |
| 2008/0133133 A1* | 6/2008 | Abels | 701/213 |
| 2010/0251283 A1* | 9/2010 | Smith | 725/25 |
| 2011/0018738 A1* | 1/2011 | Feroldi | 340/905 |
| 2013/0231828 A1* | 9/2013 | Seal | 701/36 |
| 2014/0025513 A1* | 1/2014 | Cooke et al. | 705/17 |
| 2014/0317648 A1 | 10/2014 | Petrucci et al. | |

OTHER PUBLICATIONS

United States Patent and Trademark Office, Office Action for U.S. Appl. No. 13/896,212, mailed Nov. 13, 2014.
United States Patent and Trademark Office, Final Office Action for U.S. Appl. No. 13/896,212, mailed May 29, 2015.

\* cited by examiner

*Primary Examiner* — Lixi C Simpson
(74) *Attorney, Agent, or Firm* — Ingrassia Fisher & Lorenz, P.C.

(57) ABSTRACT

Methods and apparatus are provided for a video playback control system for a vehicle having a front cabin and a rear cabin. The apparatus can include at least one first display located in the front cabin, and at least one second display located in the rear cabin. The apparatus can also include a source of video data for display on the at least one first display and the at least one second display. The apparatus can include a control module that outputs a single still video frame or series of still video frames from a continuous video stream provided by the source of video data for display on the at least one first display.

19 Claims, 3 Drawing Sheets

SYSTEMS AND METHODS FOR VIDEO PLAYBACK CONTROL

TECHNICAL FIELD

The present disclosure generally relates to vehicles and more particularly relates to systems and methods for video playback control in a vehicle.

BACKGROUND

Many vehicles employ rear seat entertainment devices, for example, devices that allow for video playback in a rear cabin of the vehicle. Generally, the rear seat entertainment devices can be used to entertain younger passengers, who are unable to operate or control the video playback on the rear seat entertainment device. Thus, in many instances, a driver of the vehicle needs to be able to control the playback of the rear seat entertainment device. This can be problematic, as certain locations prohibit the display of a continuous video stream in a front cabin of the vehicle due to driver distraction concerns.

Accordingly, it is desirable to enable a driver of a motor vehicle to control the playback on a rear seat entertainment device without using a continuous video stream. Furthermore, other desirable features and characteristics of the present invention will become apparent from the subsequent detailed description and the appended claims, taken in conjunction with the accompanying drawings and the foregoing technical field and background.

SUMMARY

An apparatus is provided for a video playback control system for a vehicle having a front cabin and a rear cabin. The apparatus can include at least one first display located in the front cabin, and at least one second display located in the rear cabin. The apparatus can also include a source of video data for display on the at least one first display and the at least one second display and a control module that outputs a single still video frame from a continuous video stream provided by the source of video data for display on the at least one first display.

A method is provided for controlling video playback in a rear cabin of a vehicle. The method can include receiving a source of video data, and outputting a continuous stream of the video data to at least one second display located in the rear cabin of the vehicle. The method can include determining a position for a transmission of the vehicle, and if the transmission is in a park position, outputting the continuous stream of the video data to at least one first display located in a front cabin of the vehicle. The method can also include if the transmission is not in the park position, outputting a single still video frame or a series of still video frames from the continuous stream of the video data to the at least one first display.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
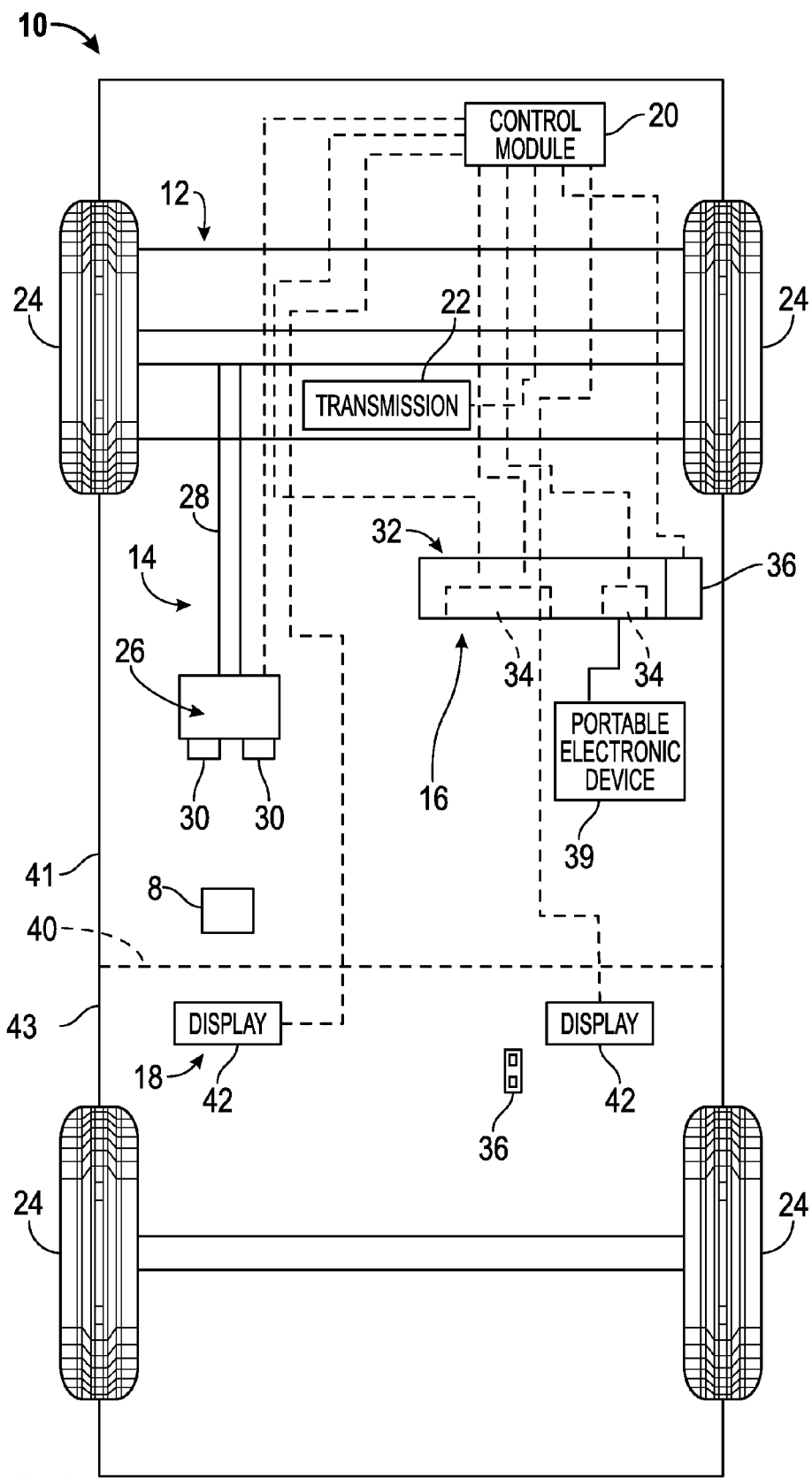
FIG. 1 is a functional block diagram illustrating a vehicle that includes a video control system in accordance with various embodiments.

With reference to FIG. 1, a vehicle 10 is shown. The vehicle 10 can include a powertrain 12, a steering system 14, a video control system 16, a rear entertainment system 18 and a control module 20. As will be discussed in greater detail herein, the control module 20 can receive inputs from the video control system 16 to control the operation of the rear entertainment system 18.

Generally, the vehicle 10 can include the powertrain 12 for propulsion. The powertrain 12 can include, for example, a propulsion device, including, but not limited to, an internal combustion engine, electric engine or hybrid thereof (not shown). The propulsion device can supply power to a transmission 22, which can transfer this power to a suitable driveline coupled to one or more wheels (and tires) 24 of the vehicle 10 to enable the vehicle 10 to move. As is known to one skilled in the art, the transmission 22 can comprise a suitable gear transmission, which can be operated in a variety of gear positions, including, but not limited to park, neutral, reverse, drive, etc. The transmission 22 can be a manual transmission or an automatic transmission, as known to one skilled in the art. The control module 20 can be in communication with the transmission 22 to receive or determine the current position of the transmission 22. Alternatively, the current position of the transmission 22 can be provided to the control module 20 from other modules associated with the vehicle 10, or through a transmission gear selector operable by a driver 8 of the vehicle 10, if desired.

With continued reference to FIG. 1, the steering system 14 can include a hand wheel 26 coupled to a steering shaft 28, which can cooperate with the powertrain 12 to steer the vehicle 10. It should be noted that the use of a hand wheel is merely exemplary, as the steering system 14 can include any suitable device for steering the vehicle 10, including, but not limited to, a joystick. In this example, the hand wheel 26 can include one or more user input devices 30, which can provide an input to the control module 20. The powertrain 12 and steering system 14 are shown only in block form and without further detailed description, as embodiments of these mechanisms are varied and well known to those skilled in the art.

The video control system 16 can include a first display or display 32 and a video player 34. The display 32 can be in communication with the control module 20 and can provide visual information to the driver 8 and/or other users of the vehicle 10. In one example, the display 32 can be implemented as a flat panel display in an instrument panel or console of the vehicle 10. Those skilled in the art realize other techniques to implement the display 32 in the vehicle 10. The display 32 can comprise any suitable technology for displaying information, including, but not limited to, a liquid crystal display (LCD), organic light emitting diode (OLED), plasma, or a cathode ray tube (CRT). The video control system 16 can also include one or more user input devices 36. In one example, the user input device 36 can be implemented with the display 32, and can receive inputs from a user, such as the driver 8 of the vehicle 10 or from other occupants in the vehicle 10, to control the rear entertainment system 18. Alternatively, or in addition to, the user input device 36 may be implemented as a keyboard (not separately shown), a remote control, a microphone (not separately shown), a touchscreen layer associated with the display 32, or other suitable device to receive data and/or commands from the user, which can be communicated to the control module 20. Of course, multiple input devices 36 can also be utilized.

The video control system 16 can also include one or more input ports 38, including, but not limited to, a USB port, SD port, HDMI port, which can enable a portable electronic device 39 to be coupled to the video control system 16. For example, the portable electronic device 39 can include, but is not limited to, a tablet personal computing device, cellular phone, portable DVD™ player, portable BLU-RAY DISC™ player and/or mobile gaming station, which can be coupled to the video control system 16 to provide a source of video data. It should be noted that although the one or more input ports 28 are illustrated herein as being associated with the display 32, the input ports 28 could be located at any desired location within the vehicle 10, including, but not limited to, the display 32, a console associated with a front cabin 41 of the vehicle 10 or a console associated with a rear cabin 43 of the vehicle 10.

The video player 34 can receive as input a source of video data. In one exemplary embodiment, the video player 34 can be implemented with the display 32, however, the video player 34 could be implemented as a separate device, which could be located at any desirable location within the vehicle 10. The video player 34 can comprise any suitable device that can recognize and output the video data to the control module 20, including, but not limited to, a DVD™ reader, a BLU-RAY DISC™ reader, an MPEG video reader and combinations thereof. Similarly, the source of video data received through the video player 34 can include, but is not limited to, a DVD™ disc, a BLU-RAY DISC™, an MPEG video source, a web-based source of streaming video data and a source of video data available from other modules associated with the vehicle 10. It should be noted that although a single video player 34 is illustrated herein, the vehicle 10 can include any number of video players 34.

The rear entertainment system 18 can be located behind or rearward of the driver 8 of the vehicle 10. In other words, the rear entertainment system 18 can include any entertainment system that is not easily assessable or viewable by the driver 8. In one example, a line 40 can separate the vehicle 10 into the front cabin 41 and the rear cabin 43. Generally, the driver 8 of the vehicle 10 can be seated within seats located in the front cabin 41 and one or more passengers can be seated within seats located in the rear cabin 43. The rear entertainment system 18 can be located within the rear cabin 43 and viewable by those seated with the rear cabin 43. In one example, the rear entertainment system 18 can include at least one second display or one or more displays 42. The displays 42 can be in communication with the control module 20 to receive video data for display on the displays 42. It should be noted that displays 42 can be located at any desired position within the rear cabin 43, including, but not limited to, a headrest of a seat located within the front cabin 41, a console coupled to a headliner of the vehicle 10 in the rear cabin 43 or a console located on a floor of the rear cabin 43. In one example, the displays 42 can receive the same video output from the control module 20, however, it should be noted that the control module 20 could output different video data to each of the displays 42, in the case where each display 42 has a dedicated video player 34. The displays 42 can comprise any suitable technology for displaying information, including, but not limited to, a liquid crystal display (LCD), organic light emitting diode (OLED), plasma, or a cathode ray tube (CRT).

The control module 20 can control the rear entertainment system 18 based on signals received from the user input devices 30, 36, and the transmission 22. In one example, the control module 20 can control the output of the video data on the display 32 and displays 42 based on signals received from the user input devices 30, 36, and the transmission 22. In certain implementations, "raw" sensor or status data provided by the transmission 22 may initiate the generation of suitable control signals that in turn are received and processed by the control module 20. In such implementations, the control signals themselves may be generated by another control module, an interface or translation device, or the like. In other words, the transmission 22 may, but need not, be the source of the actual control/command signals that are utilized by the control module 20 to control the rear entertainment system 18. It should be noted that the control module 20 can be in communication with the display 32, displays 42, one or more input ports 38, user input devices 30, 36, and the transmission 22 over a communication bus, such as a data bus, associated with the vehicle 10.

Figure 2:
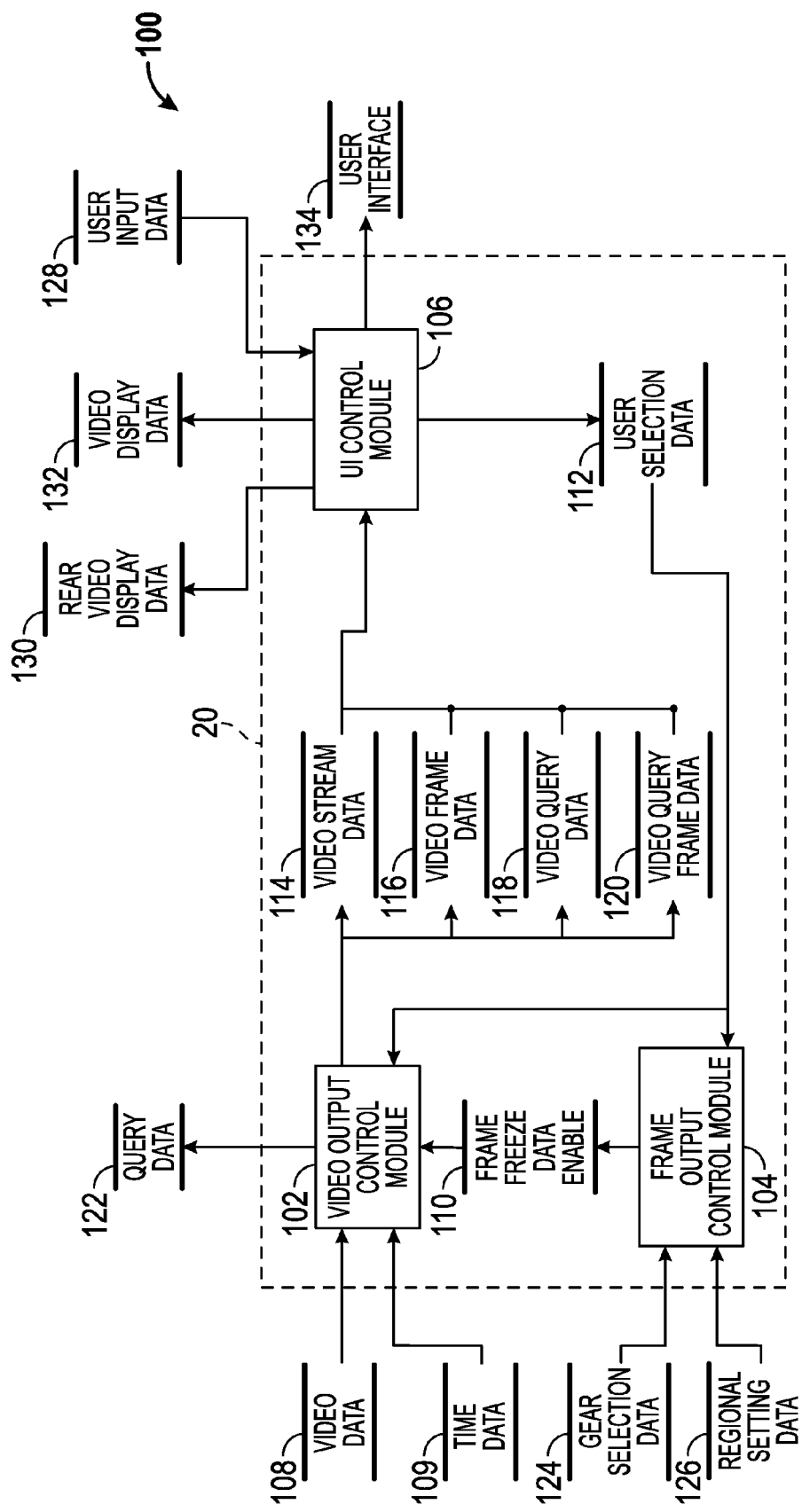
FIG. 2 is a dataflow diagram illustrating a video playback control system of the video control system in accordance with various embodiments.

Referring now to FIG. 2, a dataflow diagram illustrates various embodiments of a video playback control system 100 for the rear entertainment system 18 (FIG. 1) that may be embedded within the control module 20. Various embodiments of the video playback control system 100 according to the present disclosure can include any number of sub-modules embedded within the control module 20. As can be appreciated, the sub-modules shown in FIG. 2 can be combined and/or further partitioned to similarly control the video playback for the rear entertainment system 18 (FIG. 1). Inputs to the system may be sensed from the vehicle 10 (FIG. 1), received from other control modules (not shown), and/or determined/modeled by other sub-modules (not shown) within the control module 20. In various embodiments, the control module 20 can include a video output control module 102, a frame output control module 104 and a user interface (UI) control module 106.

The video output control module 102 can receive as input video data 108, time data 109, frame freeze data enable 110 and user selection data 112. The video data 108 can include video data from the video player 34 or video data received via the input ports 38. The time data 109 can be associated with a timer, and can indicate an amount of time that has elapsed since a user input was received by the user input devices 30, 36 and/or an amount of time that has elapsed during the playback of the video data 108. The time data 109 can be provided from other modules of the vehicle 10, or can be predetermined by the control module 20, if desired. The frame freeze data enable 110 can comprise an instruction to enable only intermittent video playback or single video frame display on the display 32. The user selection data 112 can be received from the UI control module 106, and can comprise user input received from the user input devices 30, 36. In one example, the user selection data 112 can include, but is not limited to, a request to advance the video, play the video, stop the video playback, pause the video playback, return to a video playback menu and play a selected content descriptor of the video, for example, to play a particular chapter and/or title associated with the video.

Based on the video data 108, time data 109, frame freeze data enable 110 and user selection data 112, the video output control module 102 can access a look-up table or a calibration table, for example, and based on the received inputs, can set video stream data 114, video frame data 116, video query data 118 and video query frame data 120 for the UI control module 106. The video output control module 102 can also output query data 122. The query data 122 can comprise a query to the video source, such as the video player 34 or portable electronic device, to acquire video data related to a selected content descriptor associated with the video based on the user selection data 112. For example, the content descriptor can include, but is not limited to, a chapter, title, segment or volume associated with the video. The video stream data 114 can comprise a continuous video stream (or any suitably formatted video content) for display on the displays 42 and/or the display 32. The video frame data 116 can comprise a single still video frame or a series of still video frames for display on the display 32. The still video frame for display on the display 32 can be selected from the continuous video stream at a predefined sampling rate, such as a new single still video frame about every 5 seconds. The video query data 118 can comprise a continuous video stream associated with the selected portion of the video from the user selection data 112 for display on the displays 42 and/or display 32. The video query frame data 120 can comprise a single still video frame associated with the selected portion of the video from the user selection data 112 for display on the display 32. In one example, the initial single still video frame from the video query frame data 120 can be displayed on the display 32 at a faster rate than the display of the video frame data 116, such as about 0.5 seconds, to provide feedback to the driver that the query request was received by the control module 20.

The frame output control module 104 can receive as input gear selection data 124, regional setting data 126 and user selection data 112. The gear selection data 124 can comprise a current gear position for the transmission 22, which can be received from the transmission 22 or from other control modules associated with the vehicle 10. The regional setting data 126 can comprise a predetermined setting for the playback of video on the display 32. For example, in certain locations, continuous video playback may be acceptable on the display 32. In other locations, continuous video playback may only be allowed if the transmission 22 of the vehicle 10 is in a park or neutral gear position. The regional setting data 126 can comprise a pre-programmed instruction for the playback of the video on the display 32, or could comprise a look-up table, accessible by the control module 20 to determine the regional setting data 126 based on a current geographical location of the vehicle 10. The current geographical location of the vehicle 10 could be received from a global positioning system associated with the vehicle 10, determined from other modules within the vehicle 10 or could comprise a default setting. Based on the gear selection data 124, regional setting data 126 and user selection data 112, the frame output control module 104 can access a look-up table or a calibration table, for example, and based on the received inputs, can set the frame freeze data enable 110 for the video output control module 102.

The UI control module 106 can receive as input user input data 128, video stream data 114, video frame data 116, video query data 118 and video query frame data 120. The user input data 128 can comprise user input received via the user input devices 30, 36. The user input data 128 can comprise a request to control the operation of the video playback on the rear entertainment system 18. Based on the user input data 128, video stream data 114, video frame data 116, video query data 118 and video query frame data 120, the UI control module 106 can access a look-up table or a calibration table, for example, and based on the received inputs, can output rear video display data 130, video display data 132 and user interface 134. The rear video display data 130 can comprise video playback for display on the displays 42, and the video display data 132 can comprise video playback, either a continuous video stream, a single video still or a stream of video stills, for display on the display 32. The user interface 134 can comprise any suitable graphical or textual interface that can cooperate with the user input devices 30, 36 to enable the user to control the operation of the rear entertainment system 18. For example, the user interface 134 could comprise one or more graphical and/or textual indicators that the user can select to advance, pause, play, stop and/or select a particular content descriptor of the video to view. It should be noted that these user interface 134 features are merely exemplary, as the user interface 134 could include any suitable graphical and/or textual indicators to enable control of video playback. Further, the user interface 134 can be superimposed on at least a portion of the rear video display data 130 and video display data 132, if desired.

Figure 3:
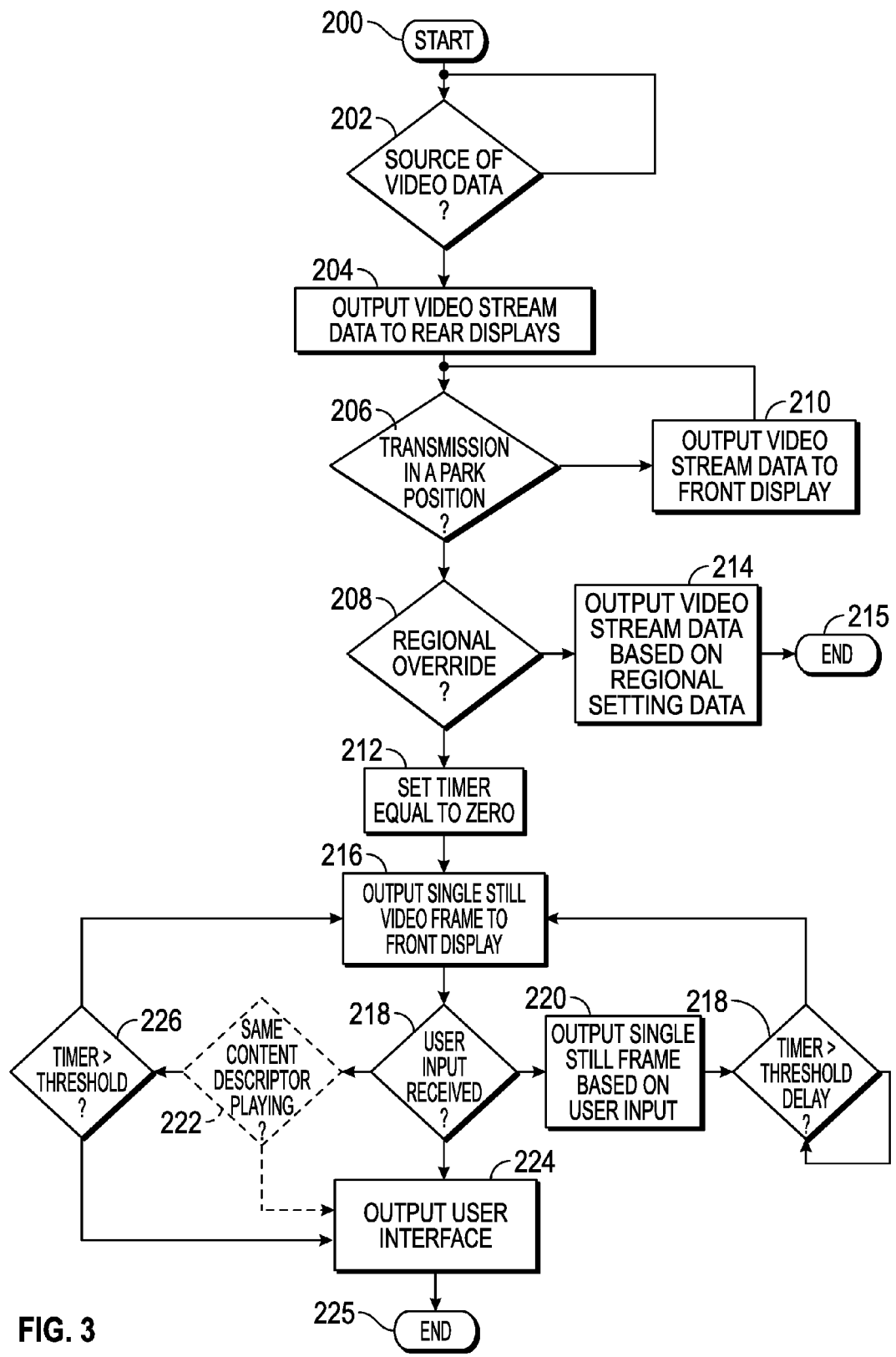
FIG. 3 is a flowchart illustrating a control method of the video control system in accordance with various embodiments.

Referring now to FIG. 3, and with continued reference to FIGS. 1 and 2, a flowchart illustrates a control method that can be performed by the control module 20 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or can run continually during operation of the vehicle 10.

The method can begin at 200. At 202, the method can determine if a source of video data 108 has been coupled to or placed in communication with the control module 20. If a source of video data 108 has been detected, then the method can go to 204. Otherwise, the method can loop.

At 204, the method can output continuous video stream from the video data, or video stream data 114, to the displays 42. Then, at 206, the method can determine if the transmission 22 of the vehicle 10 is in the park position based on the gear selection data 124. If the vehicle 10 is in the park position, then the method can go to 208. Otherwise, at 210, the method can output a continuous video stream, or video stream data 114, to the display 32. Then, the method can loop to 206.

At 208, the method can determine if a regional override exists for the particular geographical location in which the vehicle 10 is operating based on the regional setting data 126. If a regional override does not exist, then the method goes to 212. Otherwise, at 214, the method outputs a continuous video stream, or video stream data 114, to the display 32, according to the regional setting data 126. Then, the method ends at 215.

At 212, the method can set a timer equal to zero. Then, at 216, the method can output a single still video frame from the continuous video stream provided by the video data 108, or video frame data 116, to the display 32. Then, at 218, the method can determine if a user input has been received via the user input device 30, 36. If a user input has been received, then the method can go to 220. If no user input has been received, optionally, the method can go to 222. At 222, the method can determine, based on the video data 108 and the timer, if the same content descriptor of the video has been playing for a threshold period of time. For example, the threshold period of time can be greater than about three minutes. This can indicate that the driver has reached the desired viewing point for the video. If the same content descriptor of the video has been playing for a time greater than the threshold period of time, then the method can go to 224. Otherwise, at 226, the method can determine if the time since the last user input was received is greater than a threshold period of time. For example, if no user input has been received from the user input devices 30, 36 for greater than or equal to about two minutes, the method can determine that the driver has reached the desired viewing point for the video. If the time since the last user input was received is greater than the threshold period of time, then the method can go to 224. Otherwise, the method can loop to 216. At 224, the method can output the user interface 134 for display on the display 32, which can provide static controls for the playback of the video. Then, the method can end at 225.

At 220, the method can output a single still video frame for display on the display 32 based on the user input data received via the user input devices 30, 36, or the video query frame data 120. For example, if the user input is a request to display a selected content descriptor of the video, the video query frame data 120 can comprise a single still video frame from that selected content descriptor of the video. At 228, the method can determine if the timer is greater than a threshold delay, such as about one minute. If the timer is greater than the threshold, the method can go to 216. Otherwise, the method can loop. This can provide a delay, which can prevent the user from manipulating the control module 20 through repeated user input to generate a substantially continuous video stream for display on the display 32.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A video playback control system for a vehicle having a front cabin and a rear cabin, comprising:
   at least one first display located in the front cabin;
   at least one second display located in the rear cabin;
   a source of video data for display on the at least one first display and the at least one second display, the source of video data including a content descriptor associated with the video data; and
   a control module that outputs a single still video frame from a continuous video stream provided by the source of video data for display on the at least one first display, determines that the same content descriptor associated with the video data has been playing for a threshold period of time and outputs a user interface based on the determination, the user interface including one or more indicators to control the output of the video data on the at least one second display.

2. The system of claim 1, further comprising:
   a transmission coupled to a driveline of the vehicle, wherein the control module outputs the single still video frame from the continuous video stream for display on the at least one first display based on a position of the transmission.

3. The system of claim 2, wherein the control module outputs the continuous video stream for display on the at least one first display based on a park position of the transmission.

4. The system of claim 3, wherein the control module outputs the continuous video stream for display on the at least one first display based on regional setting data and the position of the transmission being different than the park position.

5. The system of claim 1, wherein the control module outputs the continuous video stream to the at least one second display.

6. The system of claim 1, further comprising:
   a video player in communication with the control module, wherein the source of video data is received as input to the video player.

7. The system of claim 1, further comprising:
   an input port in communication with the control module, wherein the source of video data is received from a portable electronic device coupled to the input port.

8. The system of claim 1, further comprising:
   a user input device in the front cabin that receives user input, wherein the control module outputs the single still video frame from the continuous video stream for display on the at least one first display based on the user input.

9. The system of claim 8, wherein the control module also outputs the user interface for display on the at least one first display after a threshold delay in receipt of user input.

10. A method of controlling video playback in a cabin of a vehicle, comprising:
    receiving a source of video data;
    outputting a continuous stream of the video data to at least one second display located in the rear cabin of the vehicle;
    determining a position for a transmission of the vehicle;
    based on the determined position of the transmission, outputting the continuous stream of the video data to at least one first display located in a front cabin of the vehicle;
    based on the determined position of the transmission being different than a park position, outputting a single still video frame or a series of single still video frames from the continuous stream of the video data to the at least one first display;
    determining, based on a content descriptor associated with the video data, that the same content descriptor of the video data has been playing for a threshold period of time; and
    outputting a user interface based on the determination that the same content descriptor of the video data has been playing for the threshold period of time, the user interface including one or more indicators to control the output of the video data on the at least one second display,
    wherein outputting the user interface comprises superimposing the user interface on at least a portion of the video data displayed on the at least one first display.

11. The method of claim 10, wherein based on the determined position of the transmission being different than the park position, outputting the continuous stream of the video data to the at least one first display when a regional setting allows for continuous video playback.

12. The method of claim 10, further comprising:
    determining a user input has been received from a user input device; and outputting a single still video frame based on the determination that the user input has not been received for a threshold period of time.

13. The method of claim 10, further comprising:
determining a user input has been received from a user input device; and
outputting a single still video frame that corresponds to the user input.

14. A vehicle, comprising:
a passenger cabin having a front cabin separated from a rear cabin;
a transmission coupled to a powertrain of the vehicle;
at least one first display in the front cabin;
at least one second display in the rear cabin;
a source of video data for display on the at least one first display and at least one second display, the source of video data including a content descriptor associated with the video data;
a control module that controls the display of the video data on the at least one first display and the at least one second display, and the control module:
outputs a single still video frame or series of still video frames from a continuous video stream provided by the source of video data for display on the at least one first display based on a position of the transmission;
outputs the continuous video stream on the at least one second display; and
determines that the same content descriptor associated with the video data has been playing for a threshold period of time and outputs a user interface based on the determination, the user interface including one or more indicators to control the output of the video data on the at least one second display, the user interface superimposed on at least a portion of the video data displayed on the at least one first display.

15. The vehicle of claim 14, wherein the first display is disposed in a front cabin of the passenger cabin and the control module outputs the single still video frame or series of still video frames from the continuous video stream for display on the at least one first display based on the position of the transmission being different than a park position.

16. The vehicle of claim 14, further comprising:
a video player in communication with the control module, wherein the source of video data is received as input to the video player.

17. The vehicle of claim 14, further comprising:
an input port in communication with the control module, wherein the source of video data is received from a portable electronic device coupled to the input port.

18. The vehicle of claim 14, wherein the control module outputs the continuous video stream for display on the at least one first display based on a park position of the transmission.

19. The vehicle of claim 14, wherein the control module outputs the continuous video stream for display on the at least one first display based on regional setting data and the position of the transmission being different than a park position.

* * * * *